O. COLLIER.
HOSE-COUPLING.
No. 182,270. Patented Sept. 19, 1876.
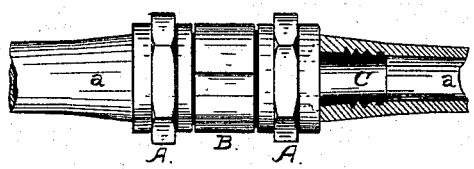
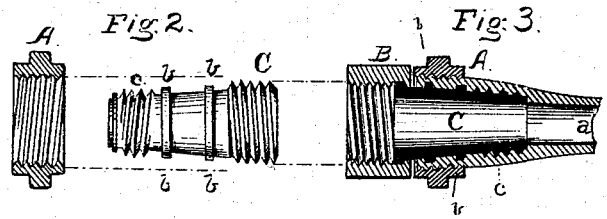
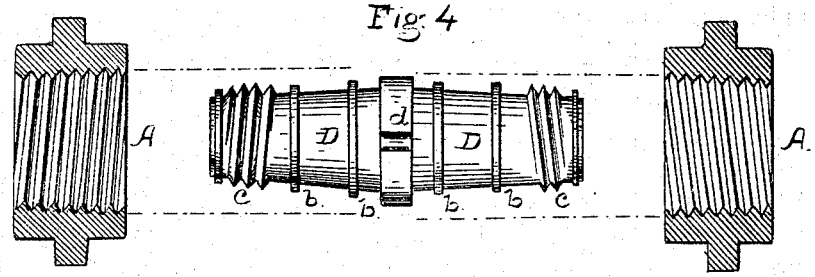

UNITED STATES PATENT OFFICE.

ORRIN COLLIER, OF SACRAMENTO, CALIFORNIA.

IMPROVEMENT IN HOSE-COUPLINGS.

Specification forming part of Letters Patent No. 182,270, dated September 19, 1876; application filed May 29, 1876.

*To all whom it may concern:*

Be it known that I, ORRIN COLLIER, of Sacramento, State of California, have invented an Improved Hose-Coupling, of which the following is a specification:

My invention has for its object to unite the ends of hose to their couplings without the use of wire, as is at present the method employed. The means employed consist of a tapering sleeve or thimble, having a coarse screw-thread and ribs upon it, and a tapering screw-nut, used in connection with the sleeve in such manner that the end of the hose is clamped and held between the sleeve and the nut without any liability of the joint becoming loose or leaking.

Figure 1 is a view of the two parts of a coupling connecting together two sections of hose. Fig. 2 is a view of one of the sleeves or thimbles, and its nut, the latter in section. Fig. 3 is a view of a coupling and a portion of the hose, in section. Fig. 4 is a view showing the construction of the sleeve and its nuts, when the same is applied to unite permanently two lengths of hose, or to mend a break.

The coupling proper is made in the ordinary form, with a screw for one part, and a screw-threaded sleeve, B, for the other; but the ends of these couplings, where they enter the hose, I construct in the form of a conical thimble, C. This thimble I provide with collars $b$ $b$ and a coarse screw-thread, $c$, on its outer surface, so that when inserted within the end of the hose the elastic nature of the hose will cause it to fill the spaces between the ribs and the screw-threads, and when the screw-nut A is brought over the end of the joint the two surfaces of the hose and the sleeve C will be pressed intimately together.

The nuts A, that fit over the end of the sleeve, are made tapering, as shown, to conform to the taper of the sleeve C, but sufficient space is provided between the outer surface of the sleeve C and the inner surface of the screw-nut A to allow the hose $a$ to be held properly between them. The difference in the diameter of these two parts varies, of course, with the size of the coupling and the thickness of the hose.

Where this coupling is applied to join two sections of hose permanently together, or to mend a burst, as in the case of fire-hose, I construct the sleeve of the form shown at D, Fig. 4. This sleeve D is made tapering from the center toward both ends, and its surface is provided with collars or ribs $b$ $b$ and screw-threads $c$ $c$, in the same manner as the single sleeves C C. The center of this sleeve D has a collar, $d$, with a notch or slot, to receive the end of a wrench or "spanner," so that the sleeve, when inserted into two opposite ends of a break, may be turned around, and thus draw the parts or ends of the hose together, the screw-threads $c$ $c$ being made for this purpose right and left handed. The nuts A A that are placed over the ends of the hose before the sleeve D is inserted, are made conical or tapering within in the same manner and for the same purpose before described in the case of the coupling proper.

As thus constructed and applied, my invention operates to hold the ends of hose to the couplings in a secure manner without the use of wire, and also to unite two parts of a hose permanently, when desired.

In the case of a burst in the hose of a fire-engine my invention is of great value, as it can be instantly applied to join the two parts together, and therefore render it unnecessary to remove the entire length of hose and replace it by a new one. My invention can be also applied to connect conductors of a metallic nature as well as those formed of flexible material.

Having thus fully described my invention, what I claim therein as new, and desire to secure by Letters Patent, is—

The combination, with the hose $a$, of a tapering sleeve, provided with screw-threads $c$ and collars $b$, and a screw-threaded nut, A, substantially as described and shown.

In testimony that I claim the foregoing, I have hereunto set my hand and seal this 15th day of May, 1876.

ORRIN COLLIER. [L. S.]

Witnesses:
 C. W. M. SMITH,
 PHILIP MAHLER.